United States Patent [19]
Macken

[11] Patent Number: 5,237,149
[45] Date of Patent: Aug. 17, 1993

[54] LASER MACHINING UTILIZING A SPACIAL FILTER

[76] Inventor: John Macken, 3755 Wallace Rd., Santa Rosa, Calif. 95404

[21] Appl. No.: 857,973

[22] Filed: Mar. 26, 1992

[51] Int. Cl.⁵ .............................................. B23K 26/06
[52] U.S. Cl. ........................... 219/121.73; 219/121.64; 219/121.72; 219/121.75
[58] Field of Search ...................... 219/121.63, 121.64, 219/121.72, 121.73, 121.74, 121.75, 121.77, 121.78

[56] References Cited
U.S. PATENT DOCUMENTS 3,281,712 10/1966 Koester ...................... 219/121.73 X
3,534,462 10/1970 Cruickshank et al. ..... 219/121.75 X Primary Examiner—C. L. Albritton
Attorney, Agent, or Firm—Larry D. Johnson

[57] ABSTRACT

The performance of a high power laser machining system is improved by the inclusion of a spacial filter which is between the laser and the work piece. A preferred embodiment of the spacial filter uses line foci and slit apertures.

7 Claims, 2 Drawing Sheets

LASER MACHINING UTILIZING A SPACIAL FILTER

BACKGROUND OF THE INVENTION

1. Technical Field of the Invention

The present invention relates to lasers used for material processing, and more particularly to the design and use of a spacial filter aperture external to the laser to achieve increased speed in laser machining operations.

2. Prior Art

A major use for high power lasers is material processing. In particular, high power lasers are used for cutting and welding of metals. The initial penetration of a focused laser beam into the metal can sometimes take a significant amount of time. This is especially true when a continuous high power CO2 laser is used to cut or weld reflective metals such as aluminum. This initial penetration delay also results in an enlarged hole and a large heat affected zone. In some cases, the problem can be so extreme that it is not possible to make the initial penetration in the middle of a piece of metal. Only if the penetration is initiated at the edge of the metal, can the laser be used. This problem has merely been accepted as an unavoidable result of the high reflectively of the metal. In the case of aluminum, coatings have been developed which can decrease the surface reflectivity and thereby assist in this penetration phase. However, these coatings present an extra step in application and removal. Also in the case of laser welding, coatings can introduce contamination into the weld area.

The invention described herein involves the use of an external spacial filter. In the prior art, a spacial filter is sometimes used with low power lasers such as a helium neon laser to eliminate imperfections in the beam. For example, in holography, it is desirable to utilize a homogenous laser beam. In this case, the laser beam can be passed through a spacial filter which loses some power while eliminating intensity variations in the laser beam. This is an entirely different objective and result than the effect described herein. The spacial filter usually consists of: 1) a focusing lens which brings the laser beam to a focus, 2) an aperture with a very small hole and 3) a collimating lens. The small hole in the aperture is positioned at this focus so that only light passing through this small hole continues on. The laser beam then expands and passes through the collimating lens. The power of these lasers is usually in the milliwatt range and sometimes can reach a few watts. The use of these low power lasers with spacial filters is for applications which requires a homogeneous beam. The term "spacial filter" implies that this is a filter which eliminates unwanted light distributed in space.

In the prior art applications, a spacial filter has been used as a passive element which does not influence the laser performance. In this invention, the external spacial filter becomes part of the resonant system and changes the laser characteristics as the laser is performing useful material processing work. In materials processing with high power continuous lasers, there has never been any reason to utilize spacial filters. They introduce extra expense and a loss of power without any obvious benefit. The present invention utilizes a spacial filter to obtain a new effect which benefits material processing. Since material processing requires high power, typically 500 to 5,000 watts, the prior art spacial filters used with low power lasers are completely unsuitable for use with the high power densities used with materials processing lasers.

SUMMARY OF THE INVENTION

High power lasers used in cutting or welding of reflective metal have been found to exhibit reduced performance as a result of light reflected from the work piece. This light enters the laser and causes the laser beam to wander. This is particularly true of $CO_2$ lasers using unstable resonators. This problem is greatly improved if a spacial filter is inserted between the laser and the work piece. A spacial filter usually consists of two lenses and a pinhole aperture. However, for high power use, the power density at the focus must be reduced to prevent destruction of the aperture. The preferred embodiment utilizes one dimensional foci (line focus) and slits for apertures.

DETAILED DESCRIPTION OF PREFERRED EMBODIMENTS

Figure 1:
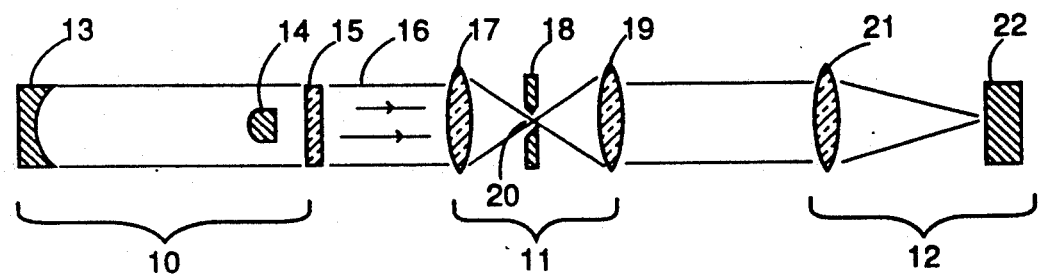
FIG. 1 is a cross-sectional view showing the relationship of laser optics, a spacial filter, and the work piece.

It has been discovered that there is an interaction between the work piece and the laser when a focused laser beam strikes the surface of a reflective metal during cutting and welding. A portion of the light reflected from the metal passes backwards through the final lens and is collimated. The lens and the work piece forms a type of retroreflective optical system known as "cat's eye." This light precisely returns to the laser. The light reflected from the work piece enters the laser and mixes with the internal laser light. The resonant condition and optical beam path inside the laser is modified by this feedback from the work piece. The laser is always attempting to optimize the resonant condition. When there is feedback from the work piece introduced into the laser cavity, the laser adjusts the wavelength and lasing direction to optimize the total resonant condition which now includes this feedback. This can result in the laser producing an output beam which is different when the feedback is present compared to the output beam when there is no feedback. This difference can result in an angle change (wandering of the focus) or collimation change (defocusing).

When a focused laser beam initially strikes a reflective metal surface, there may be no initial change in the direction of the laser beam. However, the moment that the laser beam starts to heat or penetrate one point on the metal surface, the reflectivity of this point decreases while the surrounding area remains highly reflective. With this loss of reflectivity in the preferred direction, the laser can optimize the resonance by oscillating in a slightly different direction so that the focus spot now strikes a more reflective portion of the metal. As the reflectivity degrades in another area, the beam continues to wander within the angular limits of the optical system. Finally, the entire surface within these limits is affected and penetration eventually starts.

An experiment has performed where the surface of aluminum was coated using a dye which was transparent to the laser beam. The reflectivity of the aluminum remained high yet the wandering path of the focused laser beam was recorded in the dye surface. Even though the aluminum and lens are stationary, the record indicated that the focus spot had wandered over a surprising area of the aluminum. There were also spots where the focus had dwelled long enough to melt the surface before it had moved away.

When an external spacial filter was introduced, penetration of the aluminum surface improved dramatically. This is particularly true of lasers utilizing an unstable resonator design. In fact, the feedback from the work piece can be considered as adding an additional reflector to the resonator design causing the unstable resonator to fall into the class of resonators designated as "stable resonators."

Another point is that unstable resonators usually have no semitransparent reflector which can reject part of the feedback radiation. Furthermore, in an unstable resonator, the feedback radiation undergoes amplification before it finally reaches the heart of the laser known as the Fresnel core. Therefore, the effect of external feedback is particularly great in lasers with unstable resonators. However, even with lasers utilizing stable resonators, there is the possibility of slightly off axis optical paths which optimize the feedback from the work piece.

Referring now to FIG. 1, the optical system has been divided into three segments designated 10, 11, and 12. Segment 10, represents the optical system of the laser. The group of optics designated 11 represents the spacial filter and the group designated 12, represents the final focusing optics and work piece. Mirrors 13, and 14, are the laser resonator mirrors. In this example, mirror 13 is shown as being a large concave mirror while mirror 14 is a smaller convex mirror. These mirrors are typical of an unstable resonator. However, it should be understood that this invention also applies to stable resonators. The optical gain region of the laser is not shown but lies between mirrors 13 and 14. The output window is designated 15. Since only the optical system is of concern, other components of the laser are now shown. The output beam is designated 16.

The next section is the spacial filter generally designated as 11. This consists of focusing lens 17 which causes laser beam 16 to pass through a round focus designated as 20. There is an aperture around the focus (shown here in cross section) designated 18. The laser beam then expands and passes through collimating lens 19. The beam then travels a distance to the final focusing lens designated 21. This lens focuses the beam on or near the surface of the work piece designated 22.

In this description, the presumption is that the laser beam is traveling from left to right. However, it can be seen that any reflection from work piece 22 will be collimated by lens 21 and proceed back into the laser. The laser resonant condition adjusts itself to this feedback as previously described. Therefore, the entire optical system including the final lens, 21 and work piece 22, should be considered as part of the laser mirror system as long as the surface of work piece 22 is sufficiently reflective. If aperture 18 is removed, then this increases the range of possible angles over which this entire laser/work piece optical system can resonate.

Therefore, the optimum size for the aperture in 18 is the maximum size which stabilizes the pointing direction of the beam.

In FIG. 1, aperture 18 is merely representative of the concept of a limiting aperture. In practice, the high power laser required for material processing produces a very high power density at the focus. Even though the aperture does not intercept the exact focus, still, a portion of the beam near the focus may strike the aperture. In some cases, it is not possible to build a practical aperture for use with high power lasers when the laser beam comes to a single round focus. One way of reducing the power density is to form a one dimensional focus (line focus) and use a narrow slit to aperture the focus dimension. A second line focus can then be formed perpendicular to the first and a second orthogonal slit forms a second aperture. The apertures working together limit the angular deviation of the beam in two dimensions. The formation of line foci can decrease the power density on an aperture by more than a factor of 20. In some cases, this reduction is needed in order to make a practical field stop for high power lasers.

Figure 2:
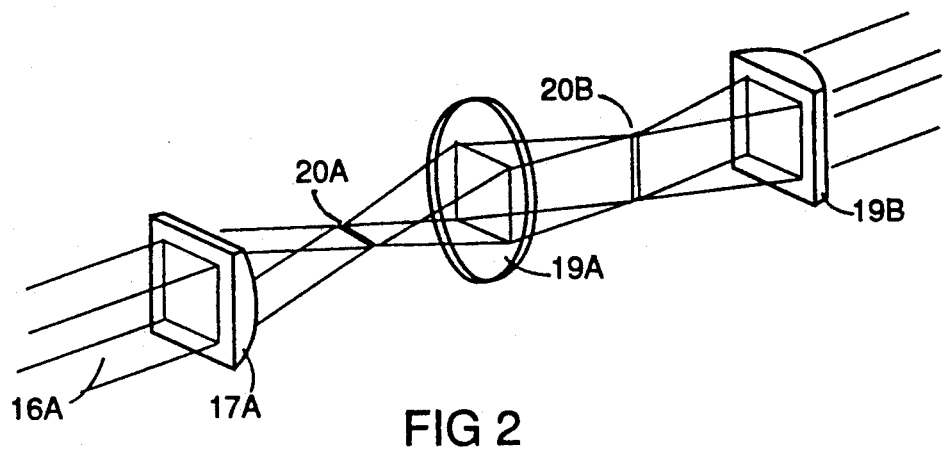
FIG. 2 is a perspective view of a portion of a spacial filter which utilizes two line foci.

FIG. 2 illustrates an optical system incorporating two orthogonal line foci. The input laser beam is designated as 16A. The first optical element is shown as a cylindrical lens designated 17A. This lens forms a horizontal line focus designated 20A. The beam then expands and strikes lens 19A. This lens is a conventional lens which would normally form a round focus if parallel light is input. However, with the cylindrical diverging light, this lens forms a second line focus. The focal length has been chosen such that light diverging from line focus 20A is collimated while parallel light is converged. This results in a second line focus (vertical) designated as 20B. The light then proceeds to cylindrical lens 19B which collimates the beam. There are no apertures illustrated in FIG. 2 in order for the optical path to be clearly observed. However, it is the intention that a vertical slit should surround line focus 20A and a horizontal slit should surround horizontal line focus 20B.

Figure 3:
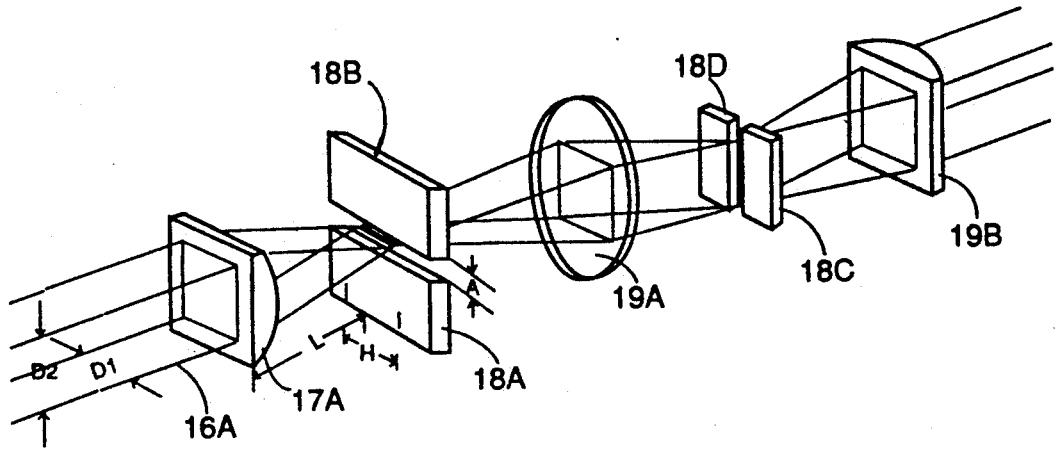
FIG. 3 is a perspective view similar to FIG. 2 but where slit apertures are added and dimensions are designated.

FIG. 3 shows a slit aperture in the vicinity of line focus 20A (FIG. 2). Here, cylindrical lens 17A, convex lens 19A, and cylindrical lens 19B are shown. The first aperture surrounding the first line focus is made of two plates designated 18A and 18B. The between 18A and 18B has a width A. Naturally, the slit is oriented parallel to the line focus in order to achieve maximum transmission. The focal length from 17A to the line focus, is designated as L. The input beam, 16A, in this example, is illustrated as being square with orthogonal dimensions of D1 and D2. If a round geometry is used, then it is to be understood that D is the diameter of the round aperture with a round beam (D1=D2). The length of the line focus is designated H as it goes through the aperture formed by 18A and 18B. FIG. 3 also shows a second slit aperture made up of plates 18C and 18D. This aperture restricts light passing through the second line focus designated 20B in FIG. 2.

Figure 4:
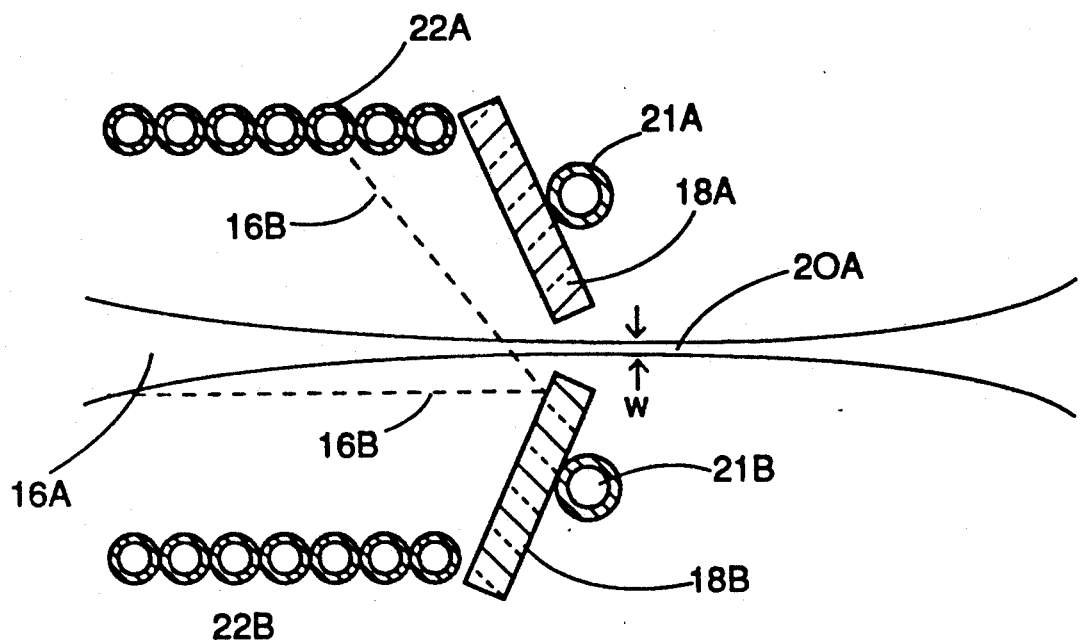
FIG. 4 is a perspective view which shows the slit aperture of FIG. 3 in more detail.

In FIG. 3, components 18A and 18B or 18C and 18D represent a simple construction for a slit aperture. FIG. 4 shows the preferred embodiment for the construction of a slit aperture. With a high power laser beam, it is necessary to know exactly where rejected laser light is going and how it is to be absorbed. It is also necessary to provide cooling for the aperture. In FIG. 4, aperture plates 18A and 18B are shown as being tipped at a slight angle to the direction of the laser beam 16A. Cooling tubes 21A and 21B are attached to the back of 18A and 18B respectively. These tubes carry liquid collant which removes heat from apertures 18A and 18B. In laser beam 16A, the line focus is the minimum width of the beam located near 20A. A stray radiation beam designated 16B is shown not passing through the line focus and, instead, reflecting off aperture 18B. This light is then reflected and strikes a cooled absorbing surface designated 22A. A similar absorbing surface is 22B. One convenient way of forming such a cooled surface is to have an absorbent coating on the surface of closely spaced pipes carrying a coolant. Absorbers 22A and 22B are illustrated in this way. The width of the line focus (20A) is designated W.

Figure 5:
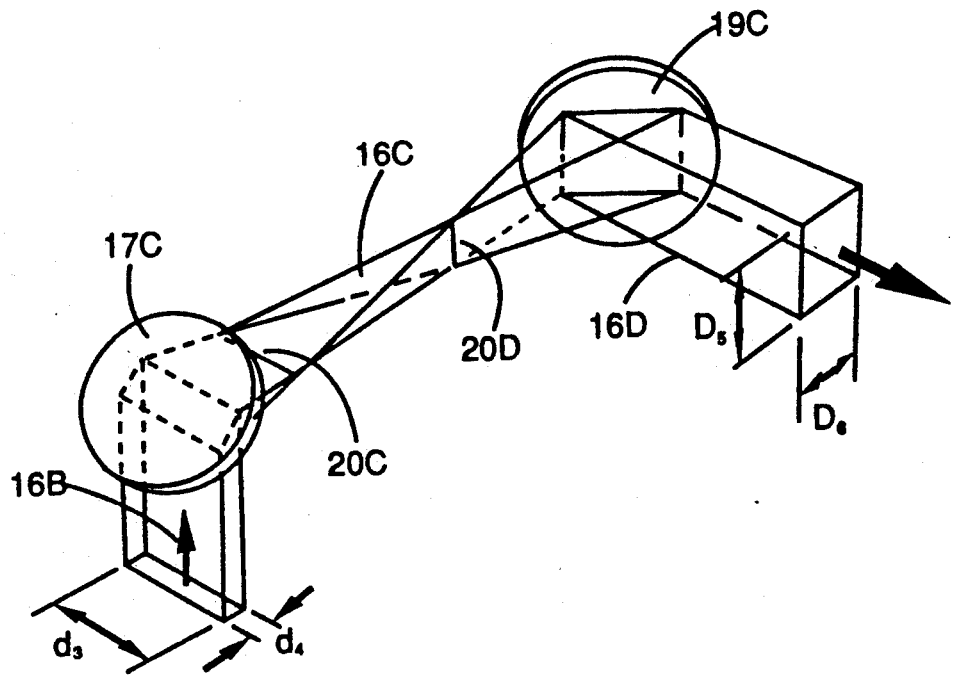
FIG. 5 is a perspective view which shows an alternative optical system which forms two line foci.

Another optical system which describes the formation of two line foci is contained in U.S. Pat. No. 4,921,338 entitled "Corrective Optics for Rectangular Laser Beams" by this inventor (John A. Macken). The optical system described in that patent, can be combined with the apertures described herein to form another example of this concept. FIG. 5, illustrates an optical system where the input beam is rectangular having orthogonal dimensions D3 and D4. The beam is designated as 16B. This rectangular beam strikes concave spherical mirror 17C, at an angle substantially away from normal incidence. This introduces spherical astigmatism upon reflection which forms two line foci designated as 20C and 20D in the reflected beam designated 16C. This beam then strikes concave spherical mirror 19C and is collimated. The above mentioned patent gives mathematical formulas for the incidence angles and curvatures to accomplish the collimation. Also, that patent explains how mirror 17C have can two different focal lengths and gives a formula for each focal length. These considerations are beyond the scope of this patent because it is merely necessary to understand that this type of optical system produces two orthogonal line foci. These two line foci (20C and 20D) would be treated with the slit apertures described in FIGS. 3 and 4. This is the preferred embodiment of this invention if a rectangular beam is used. For round or square beams, the preferred embodiment is FIG. 3 but FIG. 1 could also be used.

An important consideration is the size of the aperture. It has been experimentally found that it is possible to make the aperture large enough that there is not a significant loss of power when the laser beam is passing through this aperture and there is no feedback present. The theoretical size of the aperture would be 1.27 L1/D. (Where 1=wavelength) for a Gausian beam, or L1/D for a uniform intensity beam. In practice, it is not necessary to be this restrictive and the width of the aperture A should fall between the following limits: $0.9 L1/D < A < 5L1/D$. The dimension D is the beam size in one dimension at the focusing optics. (See FIG. 3.)

To minimize the power density on the apertures, the length of the line focus H (FIG. 3) should be at least 4 times the width of the line focus W (FIG. 4). In practice, this ratio is best if it is greater than 15. For the condition depicted in FIG. 1, where there is a round beam, aperture, and focus, the power density can be reduced if the F number is greater than 30 ($L/D > 30$).

It should also be understood that in some cases, the focal distance refers to the distance to a one dimensional line focus such as illustrated in FIGS. 2, 3, and 4 or a two dimensional focus such as represented in FIG. 1. When a two dimensional focus is achieved, it is necessary to construct an aperture capable of withstanding the power density. One approach is to use a very long focal length so that the spot size is relatively large thereby reducing the power density. It is important that the aperture is highly reflecting with an entrance angle which reflects the rejected laser beam away from the laser. If the light reflected back into the laser from the aperture, then the laser may lock on to this reflection and the effect would be lost.

In FIGS. 1, 2, and 3, lenses are used for illustration purposes. However, it should be understood that curved mirrors are the optical equivalent of lenses. Therefore, there are analogous optical systems which utilize mirrors or a combination of mirrors and lenses. For example, off axis parabolic mirrors could be substituted for lenses 17, 19, and 19A or cylindrical mirrors could be substituted for cylindrical lenses 17A and 19B. The term "spacial filter focusing means" therefore is used to designate either a lens or a mirror which forms one or more focus as part of the spacial filter. The focus could be either a conventional two dimensional focus or a one dimensional focus (line focus). Examples of a focusing means are: 17 in FIG. 1, 17A in FIG. 2, or 17C in FIG. 5. Similarly, the term "spacial filter collimating means" is illustrated by 19 in FIG. 1, 19B in FIG. 2, and 19C in FIG. 5. Lens 19 in FIGS. 2 and 3 is an example of the broad definition intended for the term "spacial filter focusing means." This lens, is a second lens in a spacial filter, but it performs the function of forming a focus (20B) in the spacial filter and therefore is covered by the term, "spacial filter focusing means." Similarly, lens 19A also performs a collimating function; therefore, it can also be termed as part of the "spacial filter collimating means."

It should also be pointed out that the focal distance L in FIG. 3, is not necessarily a linear separation distance when mirrors are involved because optical paths can be folded back. Therefore, in describing a focal length, the term, "optical path length" is used. The term, "quasi continuous laser" is used to signify a laser which is either perfectly continuous or repetitively pulsed at a high repetition rate and continues for more than ¼ second. Finally, the term "generally collimated" includes beams which have a long radius convergence or divergence. It is common for beams as they emerge from the laser to be made slightly converging in order to minimize laser beam enlargement at a distance. This is still a beam which is considered "generally collimated."

I claim:

1. A method of causing a laser beam to rapidly penetrate a partially reflecting metal work piece; the steps comprising:
    provide a laser means which generates said laser beam at a wavelength 1 and a transverse beam dimension D;
    provide a final focusing means which causes said laser beam to form a final focus on said work piece;
    position between said laser means and said final focusing means at least one spacial filter focusing means which interacts with said laser beam and causes said laser beam to form at least one focus (hereafter called a spacial filter focus) at an optical path length distance L from said spacial filter focusing means;
    provide at least one spacial filter collimating means to interact with said laser beam after said laser beam has passed through said spacial filter focus such that said laser beam is generally collimated;

provide at least one aperture means approximately at an optical path length distance L from said spacial filter focusing means;

shape said aperture means to have an opening of dimension A such that the following equation is satisfied: $0.9\ L1/D < A < 5\ L1/D$;

position said aperture means such that a substantial portion of said laser beam can pass from said laser through said aperture to said work piece while restricting the ability of a portion of said laser beam which is reflected off said partially reflective target from destabilizing said laser thereby improving the ability of said laser beam to penetrate said work piece;

2. The method of claim 1 where the step of providing a spacial filter focusing means includes providing a focusing means which forms said spacial filter focus as at least one line focus and the step of providing an aperture means includes providing at least one slit aperture and the step of positioning said at least one slit aperture includes orienting said slit aperture relative to said line focus to achieve high transmission of said laser beam through said aperture.

3. The method of claim 2 where the step of providing said spacial filter focusing means includes providing focusing means which forms first and second line foci such that said first line focus is generally orthogonal to said second line focus and the step of providing said at least one slit aperture includes providing a first slit aperture near said first line focus and providing a second slit aperture near said second line focus.

4. The method of claim 1 where the step of providing said spacial filter focusing means includes providing said spacial filter focusing means such that a single generally round spacial filter focus is formed and also providing that said distance L is at least 30 times said dimension D.

5. A method of claim 1 where the step of providing said laser means includes providing a laser which utilizes an unstable resonator mirror system and said laser beam is a quasi continuous laser beam.

6. A method of constructing a spacial filter for a high power laser beam, the steps comprising:

provide a focusing means which forms a first line focus with a line length dimension of H and a width dimension of W such that the following equation is true: $H > 4W$;

provide that said focusing means also forms a second line focus oriented generally orthogonal to said first line focus;

provide a first and a second slit apertures;

position said first slit aperture near said first line focus with an orientation of said slit which is generally parallel to said line focus;

position said second slit aperture near said second line focus with an orientation of said second slit generally parallel to said second line focus;

7. The method of claim 6 where the step of providing at least one of said slit apertures includes providing a cooling means for at least one of said slit apertures and the step of orienting at least one of said slit aperture includes orienting at least one of said aperture to reflect a portion of said high power laser beam in a predetermined direction to strike an absorbing means.

* * * * *